United States Patent Office 3,428,674
Patented Feb. 18, 1969

3,428,674
PROCESS OF OXIDATION OF OLEFINS TO UNSATURATED ALDEHYDES AND ACIDS
James L. Callahan, Cuyahoga County, Ohio, and Berthold Gertisser, Essex County, N.J., assignors to The Standard Oil Company, Cleveland, Ohio, a corporation of Ohio
No Drawing. Original application Jan. 11, 1965, Ser. No. 462,460, now Patent No. 3,308,151, dated Mar. 7, 1967. Divided and this application Sept. 30, 1965, Ser. No. 505,221
U.S. Cl. 260—533                6 Claims
Int. Cl. C07c 45/02

ABSTRACT OF THE DISCLOSURE

A catalyst consisting essentially of the oxides of Sb and U is used in the oxidation of olefins to unsaturated aldehydes and acids.

---

This application is a division of Ser. No. 462,460, filed Jan. 11, 1965, now U.S. Patent No. 3,308,151, dated Mar. 7, 1967, which in turn is a division of application Ser. No. 247,331, filed Dec. 26, 1962, now U.S. Patent No. 3,198,750, dated Aug. 3, 1965, which in turn is a continuation-in-part of Ser. No. 201,329, filed June 11, 1962, and now abandoned.

This invention relates to the catalytic oxidation of olefins to oxygenated hydrocarbons such as unsaturated aldehydes and acids, for example, propylene to acrolein, and isobutylene to methacrolein and methacrylic acid, by an oxidation catalyst system consisting essentially of oxides of antimony and uranium.

U.S. Patent No. 2,904,580, dated Sept. 15, 1959, describes a catalyst composed of antimony oxide and molybdenum oxide, as antimony molybdate, and indicates its utility in converting propylene to acrylonitrile.

British Patent 864,666, published Apr. 6, 1961, describes a catalyst composed of an antimony oxide alone or in combination with a molybdenum oxide, a tungsten oxide, a tellurium oxide, a copper oxide, a titanium oxide, or a cobalt oxide. These catalysts are said to be either mixtures of these oxides or oxygen-containing compounds of antimony with the other metal; such as antimony molybdate or molybdo-antimonate. These catalyst systems are said to be useful in the production of unsaturated aldehydes such as acrolein or methacrolein from olefins such as propylene and isobutene and oxygen.

British Patent 876,446, published Aug. 30, 1961, describes catalysts including antimony, oxygen and tin, and said to be either mixtures of antimony oxides with tin oxides or oxygen-containing compounds of antimony and tin such as tin antimonate. These catalysts are said to be useful in the production of unsaturated aliphatic nitriles such as acrylonitrile from olefins such as propylene, oxygen and ammonia.

(I) THE CATALYST

In accordance with the invention, an oxidation catalyst is provided consisting essentially of oxides of antimony and uranium. This catalyst is useful not only in the oxidation of olefins to oxygenated hydrocarbons such as unsaturated aldehydes and acids, for example, acrolein and methacrolein, and acrylic and methacrylic acid, and the oxidation of olefin-ammonia mixtures to unsaturated nitriles such as acrylonitriles, and methacrylonitrile, but also in the catalytic oxidative dehydrogenation of olefins to diolefins.

The nature of the chemical compounds which compose the catalyst of the invention is not known. The catalyst may be a mixture of antimony oxide or oxides and uranium oxide or oxides. It is also possible that the antimony and uranium are combined with the oxygen to form an antimonate or uranate. X-ray examination of the catalyst system has indicated the presence of a structurally common phase of the antimony type, composed of antimony oxide, and some form of uranium oxide. Antimony tetroxide has been identified as present. For the purposes of description of the invention, this catalyst system will be referred to as a mixture of antimony and uranium oxides, but this is not to be construed as meaning that the catalyst is composed either in whole or in part of these compounds.

The proportions of antimony and uranium in the catalyst system may vary widely. The Sb:U atomic ratio can range from about 1:50 to about 99:1. However, optimum activity appears to be obtained at Sb:U atomic ratios within the range from 1:1 to 25:1.

The catalyst can be employed without support, and will display excellent activity. It also can be combined with a support, and preferably at least 10% up to about 90% of the supporting compound by weight of the entire composition is employed in this event. Any known support materials can be used, such as, for example, silica, alumina, zirconia, alundum, silicon carbide, alumina-silica, and the inorganic phosphates, silicates, aluminates, borates and carbonates stable under the reaction conditions to be encountered in the use of the catalyst.

The antimony oxide and uranium oxide can be blended together, or can be formed separately and then blended, or formed separately or together in situ. As starting materials for the antimony oxide component, for example, there can be used any antimony oxide, such as antimony trioxide, antimony tetroxide and antimony pentoxide, or mixtures thereof; or a hydrous antimony oxide, meta-antimonic acid, orthoantimonic acid or pyroantimonic acid; or a hydrolyzable or decomposable antimony salt, such as an antimony halide, for example, antimony trichloride, trifluoride or tribromide; antimony pentachloride and antimony pentafluoride, which is hydrolyzable in water to form the hydrous oxide. Antimony metal can be employed, the hydrous oxide being formed by oxidizing the metal with an oxidizing acid such as nitric acid.

The uranium oxide component can be provided in the form of uranium oxide or by precipitation in situ from a soluble uranium salt such as the nitrate, acetate, or a halide such as the chloride. Uranium metal can be used as a starting material, and if antimony metal is also employed, the antimony can be converted to the oxide and uranium to the nitrate simultaneously by oxidation in hot nitric acid. A slurry of hydrous antimony oxide formed in situ from the metal in nitric acid also can be combined with a solution of a uranium salt such as uranium nitrate, which is then precipitated in situ as uranium oxide by the addition of ammonium hydroxide. The ammonium nitrate and any other soluble salts are removed by filtration of the resulting slurry.

It will be apparent from the above that uranium tribromide, uranium tetrabromide, uranium trichloride, uranium tetrachloride, uranium pentachloride, uranium hexafluoride, uranium tetraiodide, uranyl nitrate, uranyl sulfate, uranyl chloride, uranyl bromide, uranium trioxide, and uranium peroxide can be employed as the source of the uranium oxide component.

The catalytic activity of the system is enhanced by heating at an elevated temperature. Preferably, the catalyst mixture is dried and heated at a temperature of from about 500 to about 1150° F., preferably at about 700 to 900° F., for from two to twenty-four hours. If activity then is not sufficient, the catalyst can be further heated at a temperature above about 1000° F. but below a temperature deleterious to the catalyst at which it is melted or decomposed, preferably from about 1400° F. to about 1900° F. for from one to forty-eight hours, in the presence of air or oxygen. Usually this limit is not reached before 2000° F., and in some cases this temperature can be exceeded.

In general, the higher the activation temperature, the less time required to effect activation. The sufficiency of activation at any given set of conditions is ascertained by a spot test of a sample of the material for catalytic activity. Activation is best carried out in an open chamber, permitting circulation of air or oxygen, so that any oxygen consumed can be replaced.

The antimony oxide-uranium oxide catalyst composition of the invention can be defined by the following empirical formula:

$$Sb_aU_bO_c$$

where $a$ is 1 to 99, $b$ is 50 to 1, and $c$ is a number taken to satisfy the average valences of antimony and uranium in the oxidation states in which they exist in the catalyst as defined by the empirical formula above. Thus, the Sb valence may range from 3 to 5 and the U valence from 4 to 6.

This catalyst system is useful in the oxidation of olefins to oxygenated compounds, such as aldehydes and acids, in the presence of oxygen, and in the oxidation of olefins to unsaturated nitriles in the presence of oxygen and ammonia. Nitriles and oxygenated compounds such as aldehydes and acids can be produced simultaneously using process conditions within the overlapping ranges for these reactions, as set forth in detail below. The relative proportions of each that are obtainable will depend on the catalyst and on the olefin. The same catalyst may produce predominantly the nitrile with propylene and predominantly the aldehyde and/or acid with isobutylene. The term "oxidation" as used in this specification and claims encompasses the oxidation to aldehydes and acids and to nitriles, all of which conversions require oxygen as a reactant.

(II) OXIDATION OF OLEFINS TO ALDEHYDES AND ACIDS

The reactants used in the oxidation to oxygenated compounds are oxygen and an olefin having only three carbon atoms in a straight chain such as propylene or isobutylene, or mixtures thereof.

The olefins may be in admixture with peraffinic hydrocarbons, such as ethane, propane, butane and pentane, for example, a propylene-propane mixture may constitute the feed. This makes it possible to use ordinary refinery streams without special preparation.

The temperature at which this oxidation is conducted may vary considerably depending upon the catalyst, the particular olefin being oxidized and the correlated conditions of the rate of througput or contact time and the ratio of olefin to oxygen. In general, when operating at pressures near atmospheric, i.e., 10 to 100 p.s.i.g., temperatures in the range of 500 to 1100° F. may be advantageously employed. However, the process may be conducted at other pressures, and in the case where superatmospheric pressures, e.g., above 100 p.s.i.g., are employed, somewhat lower temperatures are feasible. In the case where this process is employed to convert propylene to acrolein, or isobutylene to methacrolein and methacrylic acid, a temperature range of from 750 to 950° F. has been found to be optimum at atmospheric pressure.

While pressures other than atmospheric may be employed, it is generally preferred to operate at or near atmospheric pressure, since the reaction proceeds well at such pressures and the use of expensive high pressure equipment is avoided.

The apparent contact time employed in the process is not critical and may be selected from a broad operable range which may vary from 0.1 to 50 seconds. The apparent contact time may be defined as the length of time in seconds which the unit volume of gas measured under the conditions of reaction is in contact with the apparent unit volume of the catalyst. It may be calculated, for example, from the apparent volume of the catalyst bed, the average temperature and pressure of the reactor, and the flow rates of the several components of the reaction mixture.

The optimum contact time will, of course, vary, depending upon the olefin being treated, but in the case of propylene and isobutylene the preferred apparent contact time is 0.5 to 15 seconds.

A molar ratio of oxygen to olefin between about 0.5:1 to 5:1 generally gives the most satisfactory results. For the conversion of propylene to acrolein, and isobutylene to methacrolein and methacrylic acid, a preferred ratio of oxygen to olefin is from about 1:1 to about 2:1. The oxygen used in the process may be derived from any source; however, air is the least expensive source of oxygen, and is preferred for that reason.

We have also discovered that the addition of water to the reaction mixture has a marked beneficial influence on the course of the reaction in that it improves the conversion and the yield of the desired product. The manner in which water affects the reaction is not fully understood but the theory of this phenomenon is not deemed important in view of the experimental results we have obtained. Accordingly, we prefer to include water in the reaction mixture. Generally, a ratio of olefin to water in the reaction mixture of from 1:1 to 1:10 will give very satisfactory results, and a ratio of from 1:3 to 1:6 has been found to be optimum when converting propylene to acrolein, and isobutylene to methacrolein and methacrylic acid. The water, of course, will be in the vapor phase during the reaction.

Inert diluents such as nitrogen and carbon dioxide may be present in the reaction mixture.

In general, any apparatus of the type suitable for carrying out oxidation reactions in the vapor phase may be employed for the execution of the process. The process may be operated continuously or intermittently, and may employ a fixed bed with a large particulate or pelleted catalyst, or a so-called "fluidized" bed of catalyst. The fluidized bed permits closer control of the temperatures of the reaction, as is well known to those skilled in the art, and a fixed bed gives closer control of contact time.

The reactor may be brought to the reaction temperature before or after the introduction of the vapors to be reacted. In a large scale operation, it is preferred to carry out the process in a continuous manner and in this system the recirculation of unreacted olefin and/or oxygen is contemplated. Periodic regeneration or reactivation of the catalyst is also contemplated. This may be accomplished, for example, by contacting the catalyst with air at an elevated temperature.

The unsaturated carbonyl product or products may be isolated from the gases leaving the reaction zone by any appropriate means, the exact procedure in any given case being determined by the nature and quantity of the reaction products. For example, the excess gas may be scrubbed with cold water or an appropriate solvent to remove the carbonyl product. In the case where the products are recovered in this manner, the ultimate recovery from the solvent may be by any suitable means such as distillation. The efficiency of the scrubbing operation may be improved when water is employed as the scrubbing agent by adding a suitable wetting agent to the water. If desired, the scrubbing of the reaction gases may be preceded by a cold water quench of the gases which of itself will serve to separate a significant amount of the carbonyl products. Where molecular oxygen is employed as the oxidizing agent in this process, the resulting product mixture remaining after the removal of the carbonyl product may be treated to remove carbon dioxide with the remainder of the mixture comprising any unreacted olefin and oxygen being recycled through the reactor. In the case where air is employed as the oxidizing agent in lieu of molecular oxygen, the residual product after separation of the carbonyl product may be scrubbed with a nonpolar solvent, e.g., a hydrocarbon fraction, in order to recover unreacted olefin and in this case the remaining gases may be discarded. An inhibitor to prevent polymerization of the unsaturated products, as is well known in the art, may be added at any stage.

The following examples, in the opinion of the inventors, represent preferred embodiments of the catalyst system of the invention, and of the processes of oxidation of olefins therewith.

Example 1

A catalyst system composed of antimony oxide and uranium oxide, having an Sb:U atomic ratio of 8:1 was prepared as follows. 90 g. of antimony was dissolved in 375 cc. of nitric acid (specific gravity 1.42) and the mixture was heated until the evolution of oxides of nitrogen had ceased. To this solution was then added a solution of 40.1 g. of uranyl acetate $UO_2(C_2H_3O_2)_2 2H_2O$ in 400 cc. of water. 300 cc. of ammonium hydroxide solution was then added, and the filtered reaction slurry washed with 600 cc. of water in three 200 cc. portions. The filter cake was dried at 120° C. overnight, calcined at 800° F. for 12 hours, and activated by heating at 1400° F. for 12 hours in a muffle furnace open to the atmosphere.

This catalyst system was then tested for catalytic activity in the oxidation of propylene to acrolein. A bench scale oxidation unit of approximately 100 ml. catalyst capacity was employed. The gas feed was metered by Rotameters and water was fed by means of a Sigma-motor pump through capillary copper tubing.

In the conversion of propylene to acrolein, the feed ratio propylene/air/nitrogen/water was 1/10/10/0.8. The apparent contact time was 3 seconds and the reaction temperature 840–860° F. The total conversion was 70.2%, per pass, of which 35.5% of the propylene feed was converted to acrolein, and 4.7% to acetaldehyde.

Example 2

An antimony oxide-uranium oxide catalyst having an Sb:U ratio of 7:1 was prepared as follows. 45 g. of antimony metal, 150 mesh, was dissolved in 186 cc. of nitric acid (specific gravity 1.42) by boiling until the evolution of oxides of nitrogen had ceased. To this was added 26.7 g. of uranyl nitrate dissolved in 200 cc. of water. 150 cc. of 28% ammonium hydroxide solution was added to the mixture. The reaction slurry was then filtered, and washed with three 100 cc. portions of wash water containing a small amount of ammonia. The catalyst was dried at 120° C. overnight, calcined at 800° F. overnight and activated by heating at 1400° F. for 12 hours in a muffle furnace open to the atmosphere.

The catalyst system was employed in the conversion of propylene to acrolein. In this case, the feed ratio propylene/air/nitrogen/water was 1/10/7/1. The apparent contact time was three seconds, and the reaction temperature was held in the range from 920–940° F. The total conversion was 65.5%, per pass, of which 36.8% of the propylene was converted to acrolein, and 3% to acetaldehyde.

Example 3

A silica-supported catalyst was prepared by mixing 60.6 g. of the activated catalyst prepared in accordance with Example 2, with 198 g. of an aqueous silica sol containing 30.0% $SiO_2$. The resulting catalyst was dried in the oven at 120° C. with occasional stirring for three hours, and calcined at 800° F. overnight.

This catalyst was then employed in the conversion of propylene to acrolein, using the reactor of Example 1. The feed ratio propylene/air/nitrogen/water was 1/10/7/1. The apparent contact time was three seconds, and the reaction temperature was held at from 880–890° F. The total conversion was 59.9%, 34.7% of the propylene feed being converted to acrolein. No acetaldehyde or other byproducts were formed.

Example 4

A catalyst system composed of antimony oxide and uranium oxide having an Sb:U ratio of 6:1 supported on one-third of its weight of silica was prepared as follows. 90 g. of 80 mesh antimony was dissolved in 360 cc. of hot concentrated nitric acid (specific gravity 1.42) and the mixture was heated until the evolution of oxides of nitrogen had ceased, and the mixture evaporated almost to dryness. To this was then added 53.4 g. of uranyl acetate $UO_2(C_2H_3O_2)_2 2H_2O$ with stirring. The mixture was ball milled for 4 hours. In removing the mass from the mill, 200 cc. of water was added, and then 194 g. of aqueous silica sol (30.6% $SiO_2$). With constant stirring, 200 cc. of 28% ammonium hydroxide solution was then added, the slurry filtered, and the precipitate washed with 300 cc. of water in three 100 cc. portions. The filter cake was dried at 120 to 130° overnight, calcined at 800° F. for 20 hours, and activated by heating at 1800° F. for 8 hours in a muffle furnace open to the atmosphere.

This catalyst system was then tested for catalytic activity in the oxidation of propylene to acrolein. A bench scale oxidation unit of approximately 100 ml. catalyst capacity was employed. The gas feed was metered by Rotameters and water was fed by means of a Sigma-motor pump through capillary copper tubing.

In the conversion of propylene to acrolein, the feed molar ratio propylene/air/nitrogen/water was 1/10/7/4. The apparent contact time was 3 seconds and the reaction temperature 840–850° F. The total conversion was 96%, per pass, 60.8% of the propylene feed being converted to acrolein, and 5.2% to acetaldehyde.

Example 5

A catalyst system composed of antimony oxide and uranium oxide having an Sb:U ratio of 4.9:1 supported on one-half its weight of silica was prepared as follows. 75 g. of 80 mesh antimony was dissolved in 275 cc. of hot concentrated nitric acid (specific gravity 1.42) and the mixture was heated until the evolution of oxides of nitrogen had ceased, and the mixture evaporated almost to dryness. To this was then added 53.4 g. of uranyl acetate $UO_2(C_2H_3O_2)_2 2H_2O$ with stirring. The mixture was ball milled for 4 hours. In removing the mass from the mill, 200 cc. of water was added, and then 226 g. of aqueous silica sol (30.6% $SiO_2$). With constant stirring, 150 cc. of 28% ammonium hydroxide solution was then added, the slurry filtered, and the precipitate washed with 300 cc. of water in three 100 cc. portions. The filter cake was dried at 120 to 130° C. overnight, calcined at 800° F. for 20 hours, and activated by heating at 1800° F. for 8 hours in a muffle furnace open to the atmosphere.

This catalyst system was then used for the oxidation of isobutylene to methacrylonitrile and to methacrolein and methacrylic acid. A fixed bed oxidation unit was employed, in the form of a 5 foot tube of ½ inch diameter No. 40 pipe. This bed was charged with 333 g. of the catalyst. The gas feed (ammonia, isobutylene and air) was metered by Rotameters, and water was fed by means of a Sigma-motor pump through capillary copper tubing. The process conditions are given in the table.

It is apparent from the table that the same catalyst can convert isobutylene either predominantly to methacrylonitrile or to methacrolein and methacrylic acid, depending on the feed (whether or not ammonia is included), and the process conditions. In either case, excellent per-pass conversions are obtainable.

| Feed Ratio: iso-$C_4$/$NH_3$/Air/$H_2O$, Molar or vol. ratio | Temperature and pressure | Apparent Contact Time, Sec. | Percent Conversion Per Pass | | | |
|---|---|---|---|---|---|---|
| | | | Total | Metha-crylo-nitrile | Metha-crolein | Metha-crylic Acid |
| 1/1/12/4 | 800° F., 4 p.s.i.g | 4 | 71.9 | 60.0 | 3.5 | |
| 1/–/8/4 | 800° F., 4 p.s.i.g | 4 | 60.2 | | 52.5 | 7.7 |

We claim:
1. The process for the manufacture of unsaturated aldehydes and acids from olefins which comprises the step of contacting in the vapor phase, at a temperature at which aldehyde formation proceeds, a mixture of oxygen and an olefin having only three carbon atoms in a straight chain, said mixture having a molar ratio of oxygen to olefin of from about 0.5:1 to about 5:1, with a catalyst composition consisting essentially of oxides of antimony and uranium as essential catalytic ingredients, the Sb:U atomic ratio being within the range of about 1:50 to 99:1.

2. The process of claim 1 in which the olefin is propylene.

3. The process of claim 1 in which the olefin is isobutylene.

4. The process of claim 1 in which the Sb:U atomic ratio in the catalyst is within the range from 1:1 to 25:1.

5. The process of claim 1 in which the catalyst composition is carried on a support.

6. The process according to claim 1 in which the catalyst composition consists essentially of an active catalytic oxide complex of antimony and uranium as an essential catalytic ingredient, the Sb:U atomic ratio being within the range from about 1:50 to about 99:1, said complex being formed by heating the mixed oxides of antimony and uranium in the presence of oxygen at an elevated temperature of 500° F. but below their melting point for a time sufficient to form said active catalytic oxide complex of antimony and uranium.

References Cited

UNITED STATES PATENTS 2,941,007   6/1960   Callahan _____ 260—604
3,009,943   11/1961  Hadley et al. _____ 260—465.3

LORRAINE A. WEINBERGER, *Primary Examiner.*

D. STENZEL, *Assistant Examiner.*

U.S. Cl. X.R.

260—604